A. L. HARVEY.
MOTOR CONTROL SYSTEM.
APPLICATION FILED SEPT. 10, 1917. RENEWED JULY 16, 1921.

1,406,376.

Patented Feb. 14, 1922.

WITNESSES:
J. T. Kurmb.
Olen Bee.

INVENTOR
Albert L. Harvey.
BY
Wesley G. Carr
ATTORNEY

UNITED STATES PATENT OFFICE.

ALBERT L. HARVEY, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

1,406,376.   Specification of Letters Patent.   Patented Feb. 14, 1922.

Application filed September 10, 1917, Serial No. 190,420. Renewed July 16, 1921. Serial No. 485,399.

*To all whom it may concern:*

Be it known that I, ALBERT L. HARVEY, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to starting devices for electric motors.

My invention has for its object to provide a simple combination of devices which operates automatically through a complete cycle to effect the starting of an electric motor and then returns to its initial position.

In the operation of starting electric motors, it is desirable that the starting apparatus operate automatically to shunt the usual starting resistor and to operate in such manner as to prevent the starting of the motor until the starting apparatus is again in its initial position, with the entire starting resistor in circuit with the motor.

I provide a motor-actuated controller which operates automatically, upon the temporary actuation of a manually operable switch, to effect the acceleration of an electric motor and to return to its initial position. The controller operates continuously in a single direction to complete the cycle described above.

Figure 1:
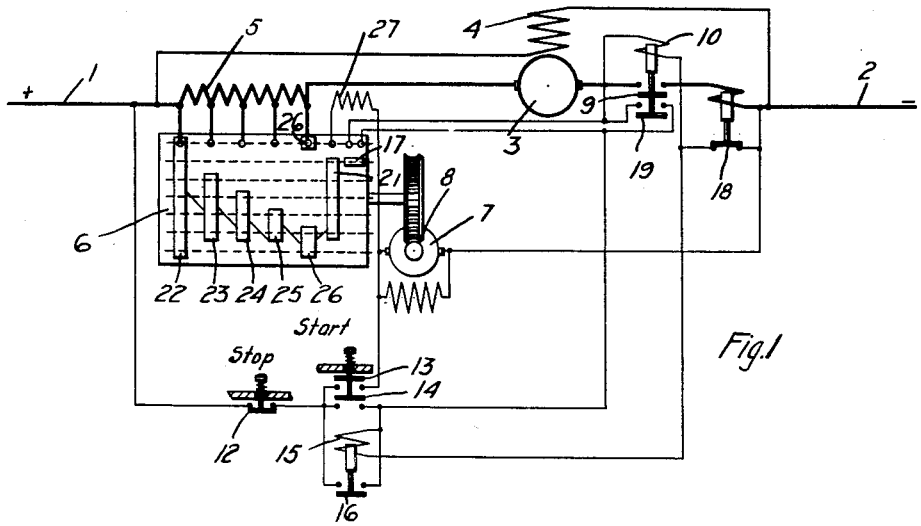
Figure 2:
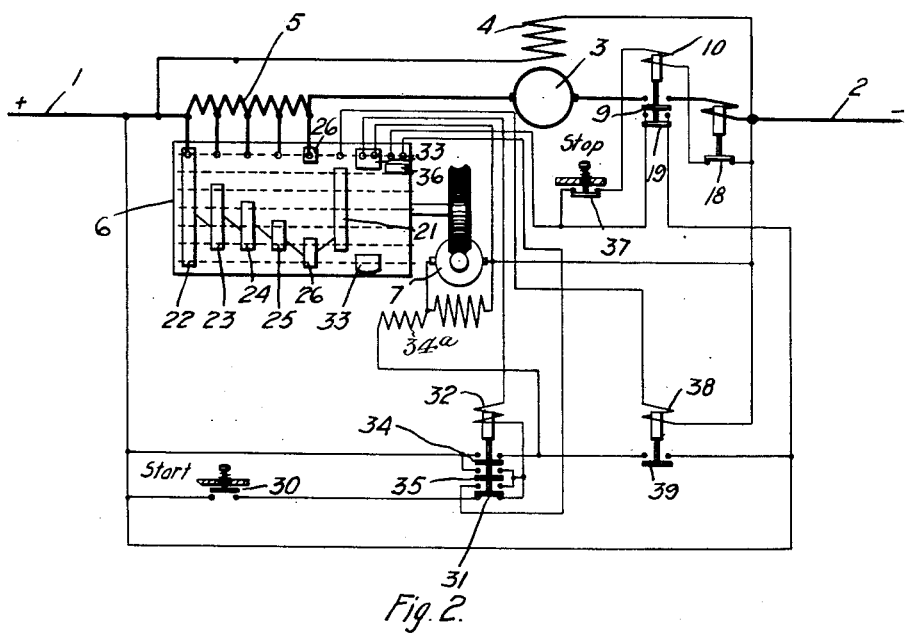

In the accompanying drawing, Fig. 1 is a diagrammatic view of circuits and apparatus embodying my invention. Fig. 2 is a view, similar to Fig. 1, of a modification. Similar reference numerals are employed to designate corresponding parts throughout the specification and drawing.

Line conductors 1 and 2 supply energy to a main motor 3 which has a shunt field-magnet winding 4. A starting resistor 5, which is in series with the armature of the motor 3, is controlled by a drum controller 6, a development of which is illustrated.

The controller 6 is actuated by a pilot motor 7 which is connected to the controller drum by suitable gear mechanism 8. The circuit of the main motor is controlled by a line switch 9 having an actuating coil 10. The several control circuits are controlled by push-button switches 12 and 13, the functions of which are indicated by appropriate legends.

To effect the starting of the main motor 3, the push-button switch 13 is actuated to complete a circuit which extends from line conductor 1 through push-button switches 12 and 13 and pilot motor 7 to line conductor 2. An interlock switch 14, which is connected to the push-button switch 13, completes a circuit for the actuating coil 15 of a relay 16 and the latter closes to shunt the interlock switch 14. The pilot motor 7 actuates the controller 6 in a clockwise direction, as viewed from the right in Fig. 1. A contact segment 17 completes a circuit for the actuating coil 10 which extends from line conductor 1 through push-button switch 12, interlock switch 14, contact segment 17, coil 10 and overload relay 18 to line couductor 2. The line switch 9 is closed to complete a circuit for the main motor. An interlock switch 19, connected to line switch 9, completes a holding circuit for the coil 10.

A second circuit, which is completed simultaneously with that controlled by the contact segment 17, is completed by a contact segment 21 when it engages its corresponding contact finger. This circuit extends from line conductor 1, through contact segments 22, 23, 24, 25, 26 and 21, resistor 27 and pilot motor 7, to line conductor 2. The push-button switch may be released at any time after the contact segment 21 completes the circuit above described, the segment 21 maintaining the circuit of the pilot motor independently of the switch 13.

The circuit of the main motor 3, which is completed by line switch 9, extends from line conductor 1 through the entire starting resistor 5, line switch 9 and coil of overload relay 18 to line conductor 2. The controller 6 effects the shunting of the several sections of the resistor 5 as the contact segments 23 to 26 successively engage the corresponding contact fingers. The main motor is thereby accelerated to its normal operating speed.

When the controller 6, which operates continuously in a single direction, has nearly completed one revolution, the contact segment 21 is disengaged from its corresponding contact finger, and the circuit of the pilot motor 7 is opened. The controller 6 accordingly comes to rest in its running position which coincides with its initial or "off" position. The main motor 3 now operates under normal conditions, with the starting resistor 5 entirely shunted by the contact segments 22 and 26.

To stop the main motor, the push button switch 12 is actuated to open the circuit of the coil 10, and the latter is de-energized to permit the line switch 9 to open. To again start the motor, it is only necessary to actuate the push-button switch 13 in the manner previously described and the sequence of operation is repeated.

In case it is desired to stop the main motor before the drum 6 has completed its cycle to shunt the entire resistor 5, the push-button switch 12 is actuated to open line switch 9. It is impossible to effect the closing of switch 10 until the pilot motor 7 has actuated the controller 6 through a complete cycle, and the contact segment 17 has engaged its corresponding contact fingers to complete the circuit of the actuating coil 10, in the manner described above.

It is impossible, also, to effect the starting of the main motor except when the entire resistor 5 is in circuit with it, if the operation of the main motor is interrupted by overload or other abnormal conditions. The operation of the overload relay 18 effects the opening of line switch 9 but does not affect the circuit of the pilot motor 7. The latter operates automatically to return the drum 6 to its initial position, whereupon it comes to rest in readiness for the next starting operation, under proper conditions.

Reference may now be had to Fig. 2 which illustrates a modification of the arrangement of Fig. 1. A description of the various devices comprising the system shown in Fig. 2 is omitted in view of the similarity to the system shown in Fig. 1.

To start the main motor 3, a push-button switch 30 is actuated to complete a circuit which extends from line conductor 1 through push-button switch 30, interlock switch 31, coil 32, and contact segment 33 to line conductor 2. The coil 32 is energized to effect the closing of a switch 34 which completes a circuit for the pilot motor 7 through a resistor 34ª. An interlock switch 35, which is connected to the switch 34, completes a holding circuit for the coil 32, and the push-button switch 30 may be released at any time after the switch 34 has closed. The operation of the system may thus be commenced by a momentary operation of the switch 30.

The pilot motor 7 actuates the drum controller 6 in a clockwise direction, as viewed from the right, Fig. 2. A contact segment 36 completes a circuit which extends from line conductor 1 through interlock switches 35 and 31, contact segment 36; push-button switch 37, coil 10 of line switch 9 and overload relay 18 to line conductor 2.

The switch 9 closes to complete the main-motor circuit which comprises the starting resistor 5. The further actuation of the controller effects the engagement of contact segment 21 with its corresponding contact finger to complete a circuit for coil 38 of relay 39. This circuit extends from line conductor 1 through the several contact segments 22 to 26 and 21 and coil 38 to line conductor 2.

The relay 39 closes to complete a shunt circuit for switch 34 and thereby maintain the circuit of the pilot motor 7 after the switch 34 opens. This action occurs immediately after the engagement of contact segment 21 with its coacting contact finger.

The continued operation of the controller effects the shunting of starting resistor 5 as the several contact segments 23 to 26 successively engage the corresponding contact fingers. When the resistor 5 has been entirely shunted and the main motor has attained its normal operating speed, the circuit of the pilot motor 7 is opened at relay 39 when the contact segment 21 opens the circuit of actuating coil 38 and the controller comes to rest in its running position, which, as in the case of the apparatus of Fig. 1, coincides with its initial or "off" position.

The operation of push-button switch 37 opens the circuit of actuating coil 10, and the line switch 9 opens the circuit of the main motor 3. The apparatus operates in the manner above described for each succeeding operation.

It will be noted that, in each of the arrangements described above, the controller operates continuously in a single direction from its initial position to successively complete a circuit for the pilot motor that is independent of the manually operable push-button switch, to effect the closing of the circuit of the main motor, to accelerate the latter and to effect the opening of the pilot motor circuit when the controller is again in its initial position.

I claim as my invention:

1. The combination with a movable device, of electro-responsive means for actuating said device continuously through a complete cycle, a manually operable switch for effecting the closing of the circuit of said electro-responsive means, means for maintaining said circuit closed after a predetermined time interval, and means for operating said electro-responsive means during said time interval upon a momentary operation of said switch.

2. In a system of control, the combination with a main motor, a controller for governing the acceleration of the motor, and a pilot motor for operating the controller, of a switch and means associated with said switch for so controlling said pilot motor as to effect the continuous operation of the controller through a complete cycle to accelerate the main motor upon a momentary operation of the switch.

3. In a system of control, a motor, a controller continuously operable in a single direction through a complete cycle for accelerating the motor, a switch, and means associated with the switch for operating the controller upon a momentary operation of the switch.

4. In a system of control, the combination with a main motor, a line switch for completing the motor circuit, and a controller operable through a complete cycle for governing the acceleration of the motor, of a manually operated switch, and a relay energized upon a momentary operation of the manually operated switch, said relay completing the energizing circuit for the line switch and having a holding circuit for maintaining itself energized for a predetermined period.

5. In a system of control, the combination with a main motor, a controller associated with the main motor continuously and operable in a single direction through a complete cycle, and a pilot motor for operating the controller, of a switch and a relay associated therewith for operating the controller upon a momentary operation of the switch, and a relay associated with the controller for maintaining the energizing circuit of the pilot motor for a predetermined period.

6. In a system of control, the combination with a main motor, and a controller for governing the acceleration of the motor and operable continuously through a complete cycle, of a switch and a relay associated therewith for effecting the operation of the controller upon a momentary operation of the switch.

7. In a system of control, the combination with a main motor and means comprising a controller operable through a complete cycle for effecting acceleration of the motor, of a relay for initiating the operation of the controller and a second relay for maintaining the operation of the controller to complete its cycle.

8. In a system of control, the combination with a main motor, a controller operable through a complete cycle for governing the acceleration of the main motor, and a pilot motor for operating the controller, of a relay for initiating the operation of the pilot motor and a second relay for maintaining the circuit of the pilot motor closed until said controller has completed its cycle of operation.

9. In a system of control, the combination with a motor, a controller operable in a single direction for governing the operation of said motor, and a pilot motor for operating the controller, of a manually operated switch and means associated with the same for operating the controller continuously through a complete cycle to accelerate the motor upon a momentary operation of the switch.

10. The combination with an electric motor and a controller for accelerating said motor, of a pilot motor for operating said controller, a manually operable switch for effecting the closing of the circuit of said pilot motor, means operable after a predetermined time interval for maintaining the circuit of said pilot motor closed, and means for operating said pilot motor to cause said controller to accelerate said motor upon a momentary operation of said switch.

11. The combination with an electric motor and a controller therefor, of a switch for initiating the operation of said controller, said switch having an actuating coil adapted to be energized when said controller occupies its initial position, a switch for energizing said coil, and a switch for continuing the operation of said controller when said controller does not occupy said initial position.

In testimony whereof, I have hereunto subscribed my name this 20th day of August, 1917.

ALBERT L. HARVEY.